United States Patent [19]
Mercer

[11] Patent Number: 6,029,399
[45] Date of Patent: Feb. 29, 2000

[54] VERTICAL BENCH

[76] Inventor: Wayne A. Mercer, 1781 Edgewater Dr., Mount Dora, Fla. 32757

[21] Appl. No.: 09/105,111

[22] Filed: Jun. 26, 1998

[51] Int. Cl.$^7$ ..................................................... A01G 9/02
[52] U.S. Cl. ................................. 47/66.5; 47/86; 206/512
[58] Field of Search ............................... 47/39, 66.5, 83, 47/86, 901; 206/423, 562, 563, 512, 511; 108/57.14, 53.1, 53.5

[56] References Cited

U.S. PATENT DOCUMENTS

| | | | |
|---|---|---|---|
| 1,991,770 | 2/1935 | Pawsat | 206/512 X |
| 2,660,328 | 11/1953 | Averill | 108/53.5 X |
| 3,549,018 | 12/1970 | Wilson | 206/509 |
| 3,701,326 | 10/1972 | Herman | 108/53.3 |
| 3,756,167 | 9/1973 | Wilson | 108/53.1 |
| 3,784,044 | 1/1974 | Bruggeman et al. | 47/39 X |
| 3,825,126 | 7/1974 | Pohl et al. | 211/71 |
| 3,887,073 | 6/1975 | Wilson | 206/511 X |
| 4,118,892 | 10/1978 | Nakamura et al. | 47/66 |
| 4,242,834 | 1/1981 | Olsen | 47/73 |
| 4,251,951 | 2/1981 | Heinstedt | 47/39 |
| 4,642,014 | 2/1987 | Saarinen | 47/86 X |
| 4,684,013 | 8/1987 | Jacobs | 206/220 |
| 4,878,313 | 11/1989 | Polesel | 47/211 |
| 5,573,558 | 11/1996 | Huang | 47/101 |
| 5,816,406 | 10/1998 | Jupille et al. | 206/511 X |

FOREIGN PATENT DOCUMENTS

| | | | |
|---|---|---|---|
| 3510720 | 9/1986 | Germany | 47/86 |

*Primary Examiner*—Michael J. Carone
*Assistant Examiner*—Jeffrey L. Gellner
*Attorney, Agent, or Firm*—Brian S. Steinberger; Law Offices of Brian S. Steinberger

[57] ABSTRACT

Vertically stackable benches and pallets for holding three inch and four inch diameter planting pots, wherein the benches can be entirely formed from wire. Each of the benches has a center portion formed from a planar shaped wire grid. Support members on opposite ends of the wire grid allow the benches to be stacked on top of one another while maintaining an airspace therebetween. Each support member has an upper bent tip extending upwardly from the surface of the grid, and a lower legs that form a downwardly opening slot opening, the legs extending below the undersurface of the grid. The bent tips of a first bench interlock into the slot in the legs of a second bench that is stacked on top of the first bench. Airspaces between each of the stacked pallets allows for seedlings in the pots to grow regardless of whether the pots are arranged in every grid opening or in staggered grid openings.

12 Claims, 11 Drawing Sheets

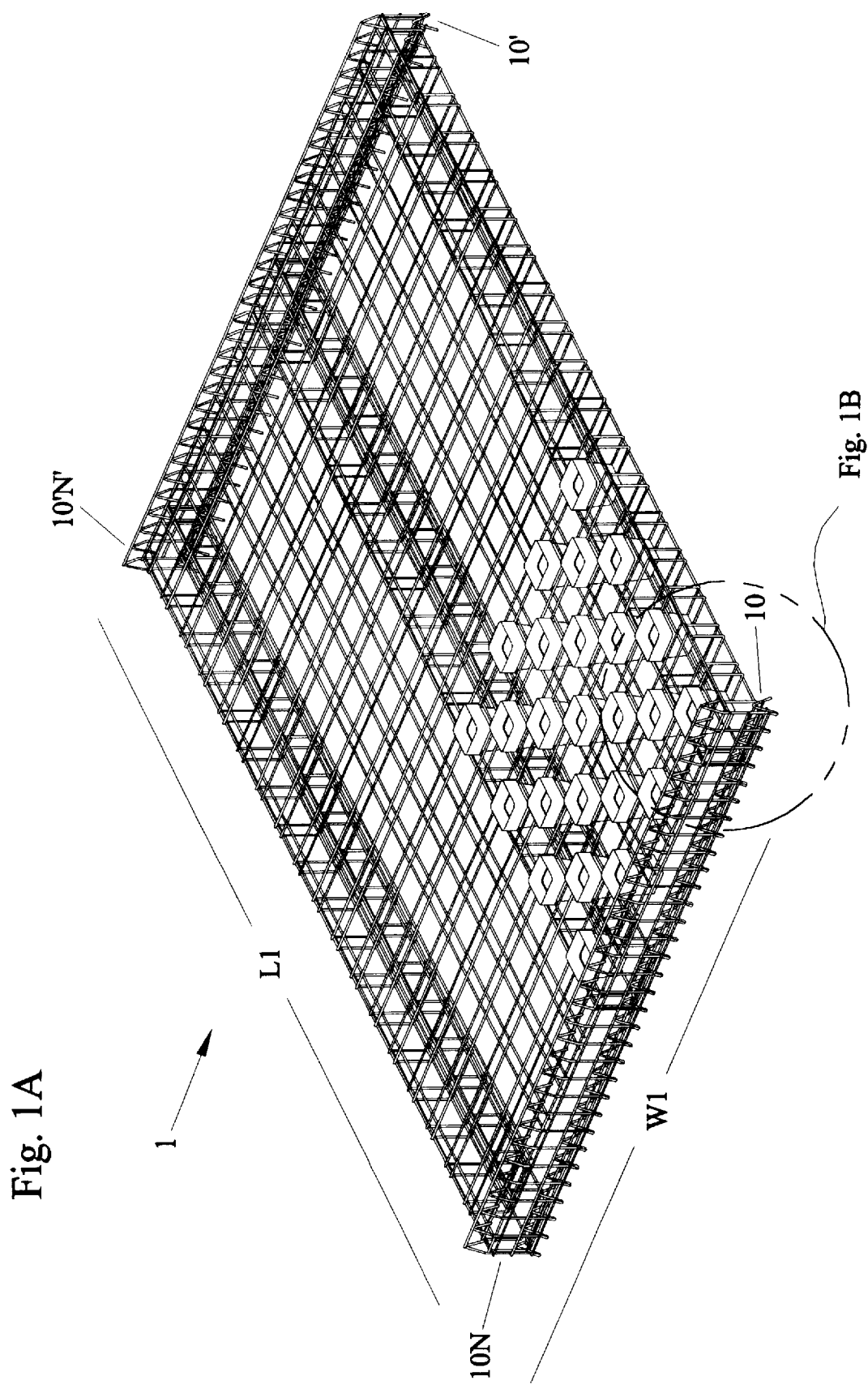

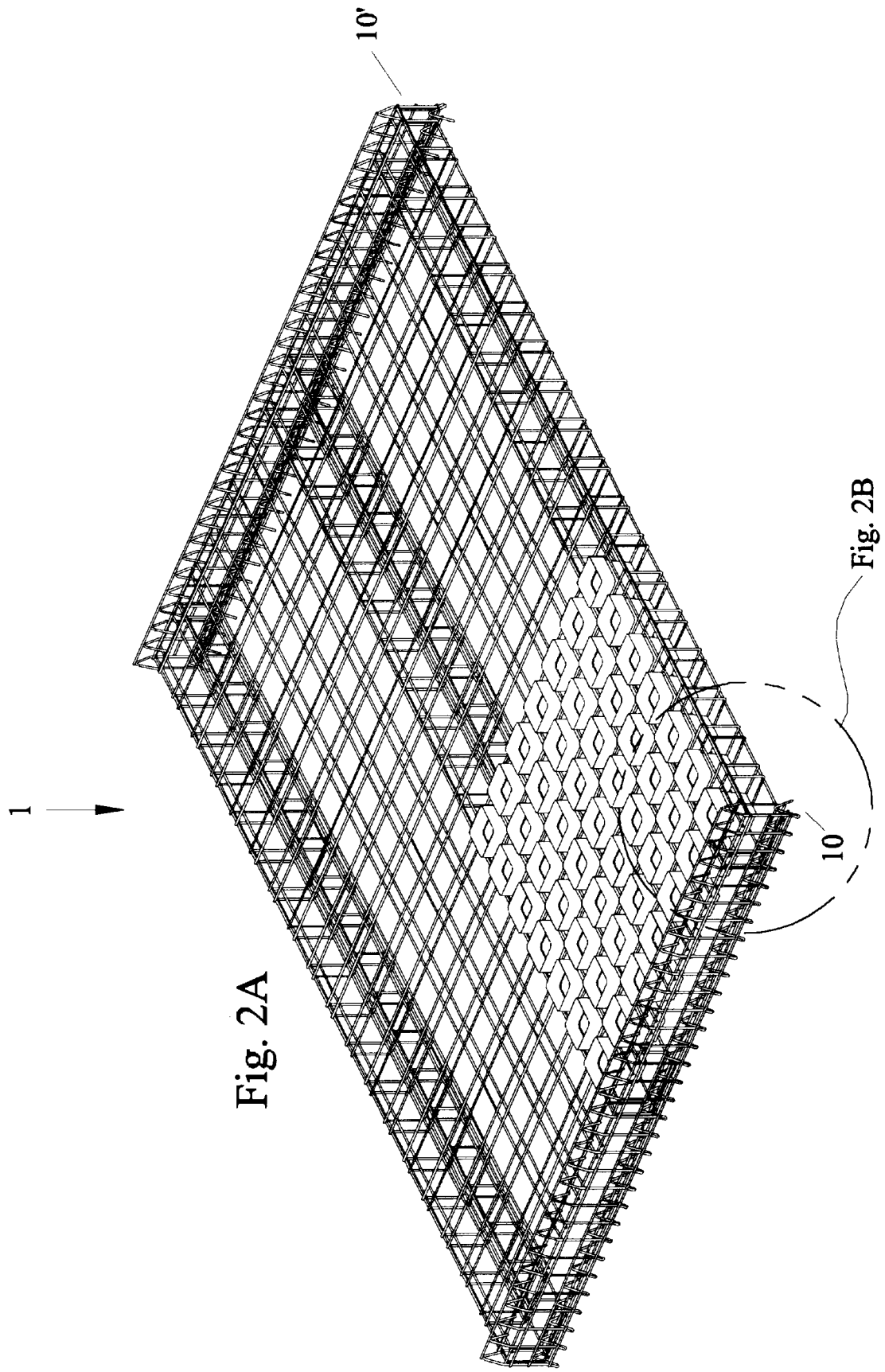

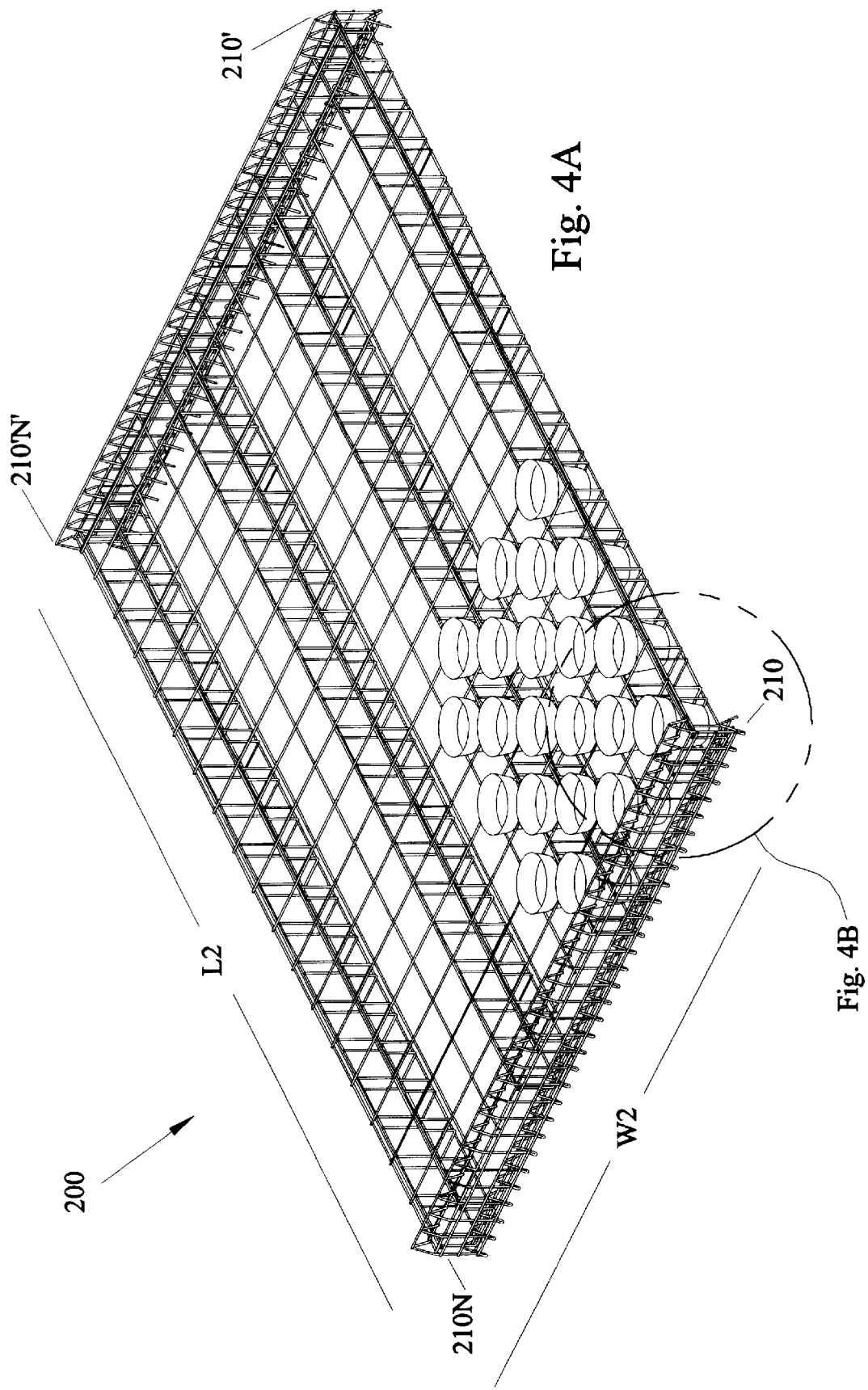

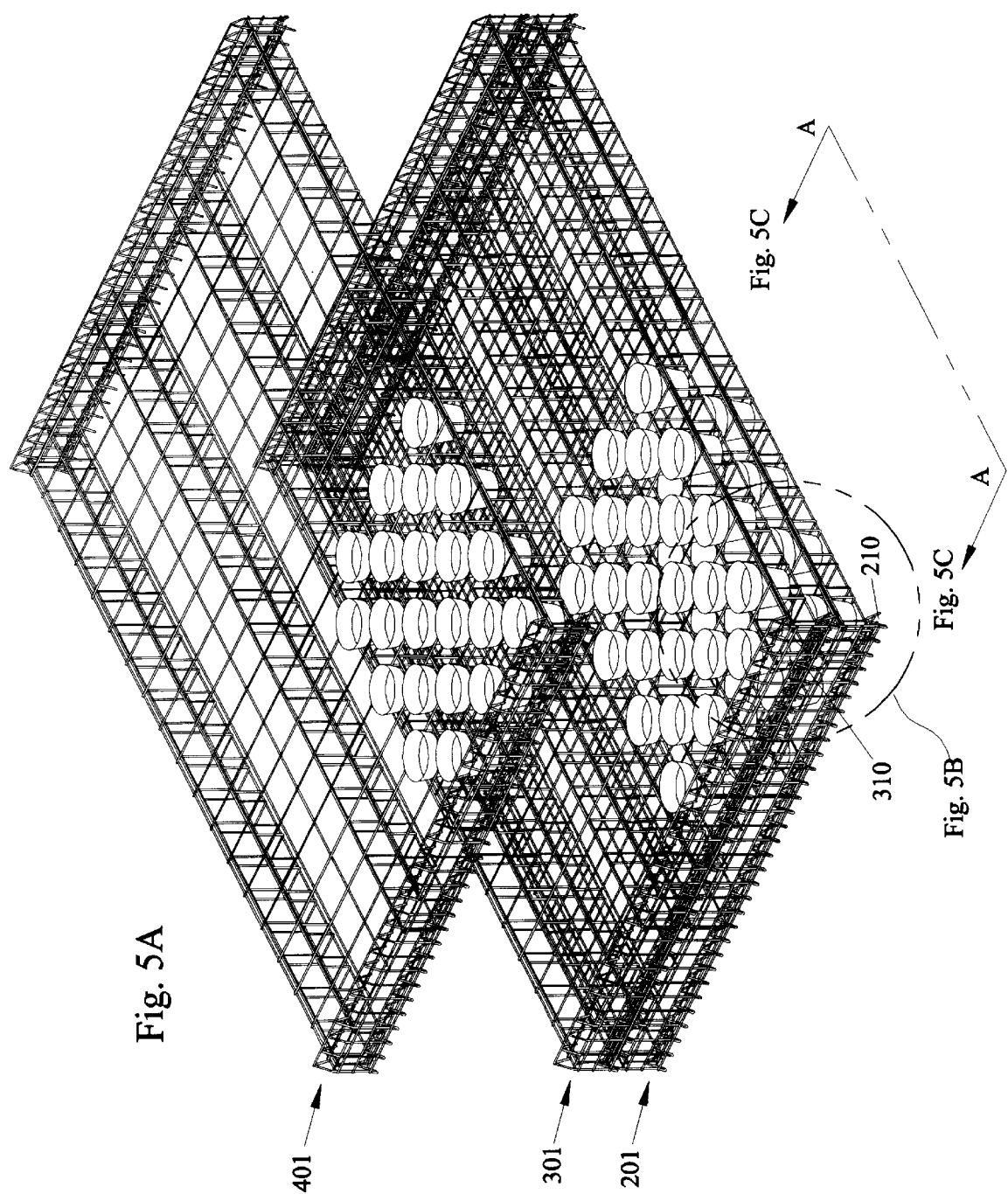

VERTICAL BENCH

BACKGROUND AND PRIOR ART

Growers in the horticultural industry face a daily need for efficient and economical methods of production. The slightest competitive edge can mean the difference in maintaining the status quo of a business in relation to other businesses as well as allow the business to grow.

Currently seed crops are grown in a cell tray or flat to be later transplanted into a finished container such as a three inch, or four inch diameter pot. The reason for germinating in a cell or flat versus a finished container is the expensive production area a crop would require for an unreasonable length of time.

The process of getting a seed to a marketable product is a labor intense undertaking. First cell trays/flats must be filled with soil, then sown with seed, then covered with additional soil or vermiculite, and then watered. The individual trays are then placed in an environment conducive for germination and later transported to a greenhouse for additional light and growth. The trays are again moved to beds ready to accept small plants. Workers then transplant the product to the finished pot size. Finally, the pots are manually separated from one another so the seedlings can continue to grow several weeks prior to shipments to nurseries, retail stores and the like.

In horticulture, as with any industry reduction of manual tasks with automation and more efficient handling is a must to production of any type. Secondly, and most importantly is space usage.

Greenhouses require an exorbitant amount of energy for both heating and cooling. The trend today has been moving toward larger greenhouses with high ceilings of some fifteen feet or more. Maintaining moderate temperatures year-round has made space utilization in these greenhouses an important financial concern.

Stackable trays have been proposed in the nursery industry where each tray has insertion areas for planting pots to be adjacent to one another. See U.S. Pat. No. 3,549,018 to Wilson; U.S. Pat. No. 3,825,126 to Pohl et al.; U.S. Pat. No. 4,118,892 to Nakamura et al.; U.S. Pat. No. 4,242,834 to Olsen; U.S. Pat. No. 4,251,951 to Heinstedt; U.S. Pat. No. 4,684,013 to Jacobs; and U.S. Pat. No. 4,878,313 to Polestel. However, there are many problems with these types of stackable trays.

For example, each of these patents require the trays to be generally injection molded from plastic. The molds needed to create these trays can be inherently expensive. Furthermore, the plastic material may fatigue and crack if several trays or more are stacked on top of one another. Furthermore, the trays in these patents when stacked do not allow for sufficient air space and light penetration between the trays to allow seedlings in the pots to grow. The close compressing of each these stacked trays to one another further promotes disease to transfer from one tray to another since disease is often carried by water. Water coming from one tray would inherently pass to a lower tray and so forth. These trays are stacked for storage purposes only. Still furthermore, these types of trays are often discarded after only one or two uses and are rarely reusable.

Wire pallets have been proposed in the prior art. See U.S. Pat. No. 3,701,326 to Herman and U.S. Pat. No. 3,756,167 to Wilson. However, neither of these patents allow for pots to be separately secured on the pallets. Still furthermore, there is no structure in these patents for allowing the pallets to be stacked on top of one another while maintaining an airspace between the pallets.

SUMMARY OF THE INVENTION

The first objective of the present invention is to provide stackable wire benches/pallets wherein each bench/pallet can individually hold a plurality of pots of seedlings.

The second object of this invention is to provide stackable wire benches/pallets that hold a seed crop in a finished container pot while allowing the crop to germinate, spike and grow to a reasonable height while remaining in the stacked positions.

The third object of this invention is to provide stackable wire benches/pallets of seed crop pots that uses 90% less space than spreading the wire benches/pallets out on a floor surface.

The fourth object of this invention is to provide stackable wire benches/pallets of seed crop pots that can be reused multiple times and last up to twenty years and longer.

A preferred embodiment of the novel bench has three main components. First, a potgripper wire layer is formed from welded wire in a grid shape which forms a seat for pots being approximately three and four inches in diameter to be dropped into. The second components include U-shaped support rails that run the width of the bench providing strength and rigidity to the top layer. Third, dual opposite interlocking sides allow the bench to be self supporting and stackable. The three components are assembled together using galvanized wire clips manufactured by Stanley-Hartco.

Each of the vertically stackable wire benches/pallets are uniform in size allowing for automation in pot filling and sowing. The wire configuration of the stacked benches permits superior growth potential without requiring additional spacing for the plants while the plants are germinating and growing. Movement of the product is greatly reduced because the traditional cell tray/flat step in the traditional production process is eliminated. Furthermore, expensive potting employees for transplanting are no longer necessary.

The vertically stackable wire benches/pallets carries a window of production flexibility for the first time. With an acre of production in use, an additional acre of growing plants by vertical benches/pallets can be ready at any given time to be moved out to the greenhouse. This gives a buffer to times when plant sales are light or heavy. Constructed of wire, the novel bench/pallet becomes transparent for allowing light penetration and air flow. Disease, often carried by water has little capacity to transfer to other pots.

Further objects and advantages of this invention will be apparent from the following detailed description of a presently preferred embodiment which is illustrated schematically in the accompanying drawings.

BRIEF DESCRIPTION OF THE FIGURES

FIG. 1A is a perspective view of the novel bench/pallet invention with three inch wide openings for holding three inch diameter pots in a staggered arrangement to one another.

FIG. 2A is a perspective view of the novel bench/pallet invention of FIG. 1A with the pots arranged in side-by-side adjacent openings.

FIG. 4A is a perspective view of the novel bench/pallet invention with four inch wide openings for holding four inch diameter pots in a staggered arrangement to one another.

FIG. 5A is a perspective view of stacking a bench/pallet of FIG. 4A having four inch wide openings on top of two previously stacked bench/pallets having four inch wide openings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1B:
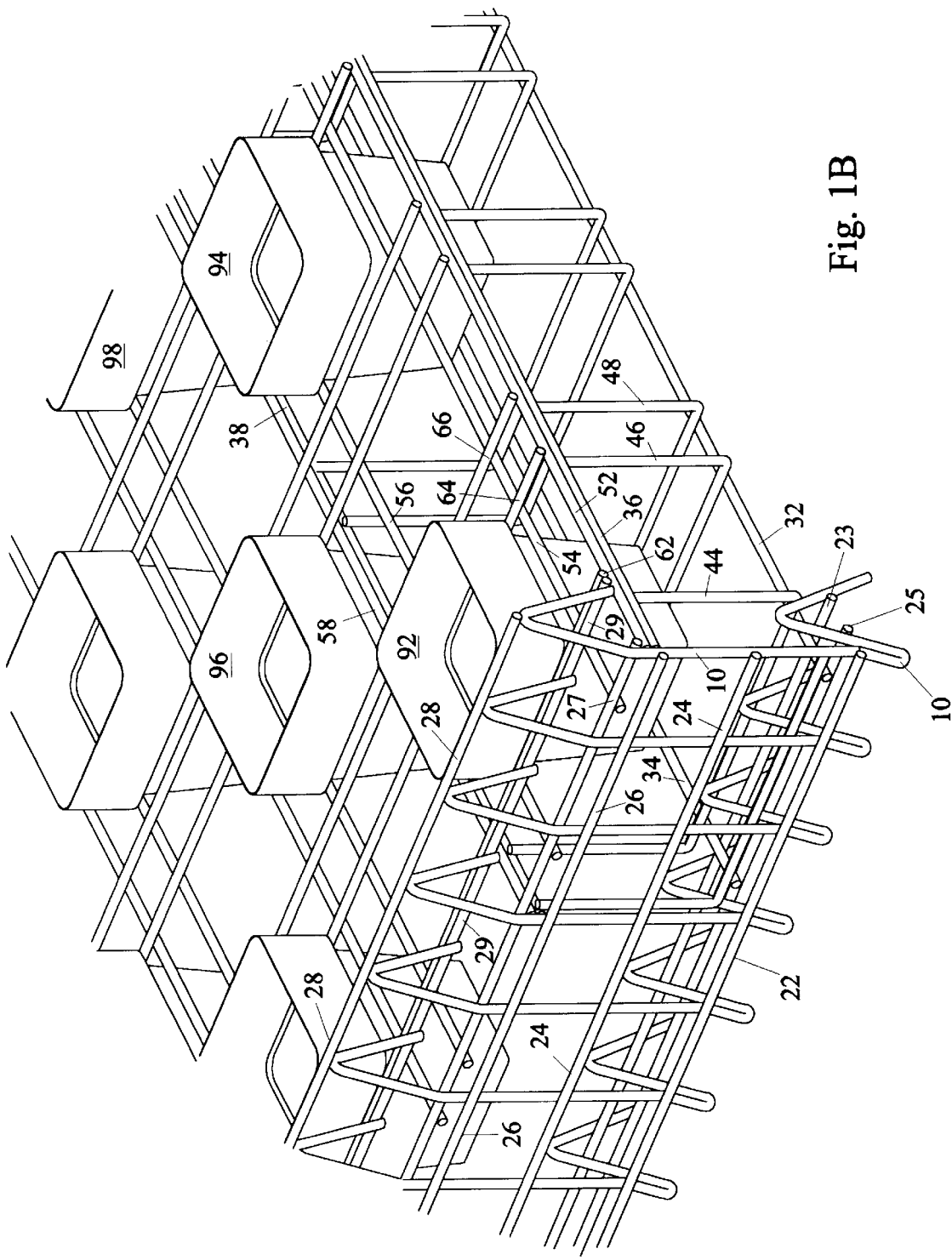
FIG. 1B is an enlarged view of a corner section of FIG. 1A.
Figure 1C:
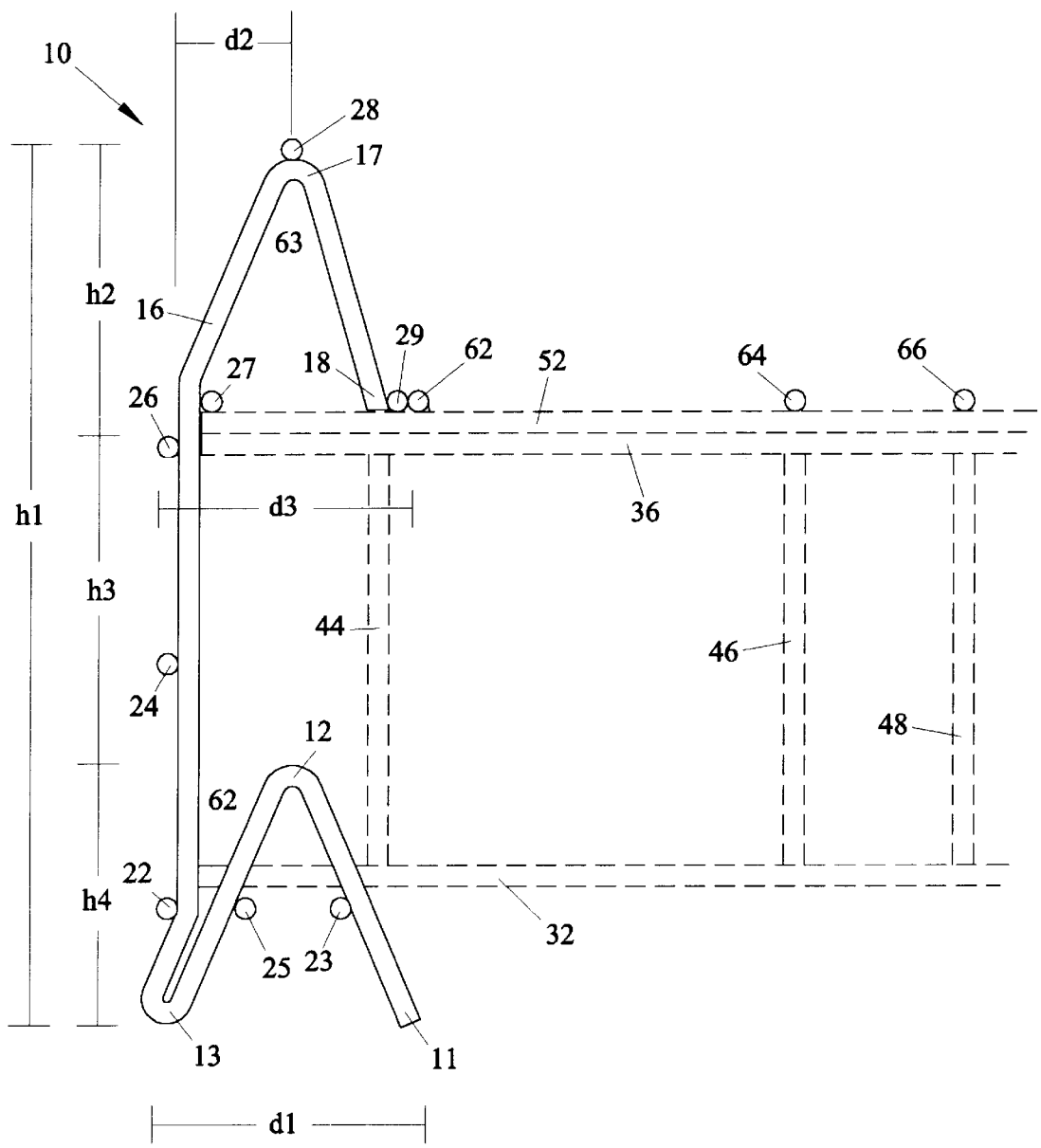
FIG. 1C is a side view of a single vertical stacking member used in the bench/pallet of FIGS. 1A–1B.

FIG. 1A is a perspective view 1 of the novel bench/pallet invention with three inch wide openings for holding three inch diameter pots in a staggered arrangement to one another. FIG. 1B is an enlarged view of a corner section of FIG. 1A. FIG. 1C is a side view of a single vertical stacking member 10 used in the bench/pallet 1 of FIG. 1A–1B. Dimensions of using the novel bench/pallet for supporting three inch diameter pots will now be described.

Referring to FIGS. 1A–1C, each vertical stacking member 10(shown more clearly in FIG. 1C) is formed from a single galvanized wire having a diameter of approximately 0.135". Member 10 has an overall height h1, of approximately 5.231". Lower portion of member 10 is formed by bending the metal wire into two legs 12-11, and 12-13, with an angle G2, therebetween being approximately 46 degrees, and the distance d1, between the leg ends 11 and 13 being approximately 1.436". Stacking member 10 has an overlapping bent portion between leg end 13 and a midpoint area 14 on leg 12-13, and forms an angle G2 between upper leg portion 14-12 and straight backing portion 1416 being approximately 23 degrees. The height h4, from upper bent portion 12 to the ground area between legs 11-12 and 12-13, is approximately 1.358". Upper arm section of stacking member 10 begins at the top end 16 of straight backing portion 16-14 with a slight inwardly angled bend so that top point 17 of member 10 has a distance d2, of approximately 536" from point 16. A downwardly angled bend at top point 17 to upper arm end 18 has an angle of approximately G3 between upper arm portion 17-18 and upper arm portion 17-16 being approximately 38.8 degrees. The outer width d3, between upper arm end 18 and the straight backing portion 16-14 is approximately 1.00".

Referring to FIGS 1A–1C, bench/pallet 1 has an overall width W1, of approximately 3', 10.635" long, and an overall length L1 of approximately 5', 4.1875". As previously described bench/pallet 1 shown in FIGS. 1A–1C, has a plurality of vertical stacking members 10 along the opposite side. The total number of vertical stacking members along a side can be represented by the symbol N. Across both width ends, approximately 10 to 10N and 10' to 10'N' stacking members are shown, where N in this preferred embodiment is 32, so that there is one stacking member 10 approximately every 1.3". Horizontal galvanized wires 22, 23, 24, 25, 26, 27, 28, 29 interconnect each of the stacking members 10–10N to one another. Horizontal cross-members 23, 25 can be welded to interior portions of legs 12-13 and 12-11 of each of the stacking members 10 through 10N. Additional outer horizontal cross-members 22, 24, 26, 28, and 29 are welded at the bottom, midpoint area and top of the straight backing portion 14-16, and the top and end of upper arm 17, 18, of each of the stacking members 10–10N.

Bottom longitudinal galvanized wire members 32, 34 (only two are shown for clarity) are welded to horizontal cross-members 23, 25. A grid is formed by welding longitudinal and horizontal wires between stacking members 10–10N, and stacking members 10'–10'N'. A portion of the grid is shown in FIG. 1B. Referring to FIG. 1B, the grid has first sets of parallel longitudinal wire members 52, 54 spaced approximately 3" apart from a second set of parallel longitudinal wire members 56, 58 each having portions welded to horizontal wires 27, 29, and 62. Perpendicular to longitudinal wire members 52, 54, 56, 58 and welded across are additional horizontal parallel wire members 62, spaced approximately 3" apart from a set of parallel wire members 64, 66. An additional longitudinal wire member 36 can be welded underneath wire member 52 for additional support. Between the wire grid of members 52, 54, 56, 58, 62, 64, 66 and bottom members 32, 34, are U-shaped channel wire members 44, 46, 48 having ends welded thereto. FIG. 1A shows that three rows of U-shaped channel members can be used on the outer edges and in the middle of the grid. As shown, the grid has approximately 3" openings between parallel sets of wire members to allow for the lip edges of 3" size pots 92, 94, 96, 98, and so forth to be supported within the 3" openings.

Figure 2B:
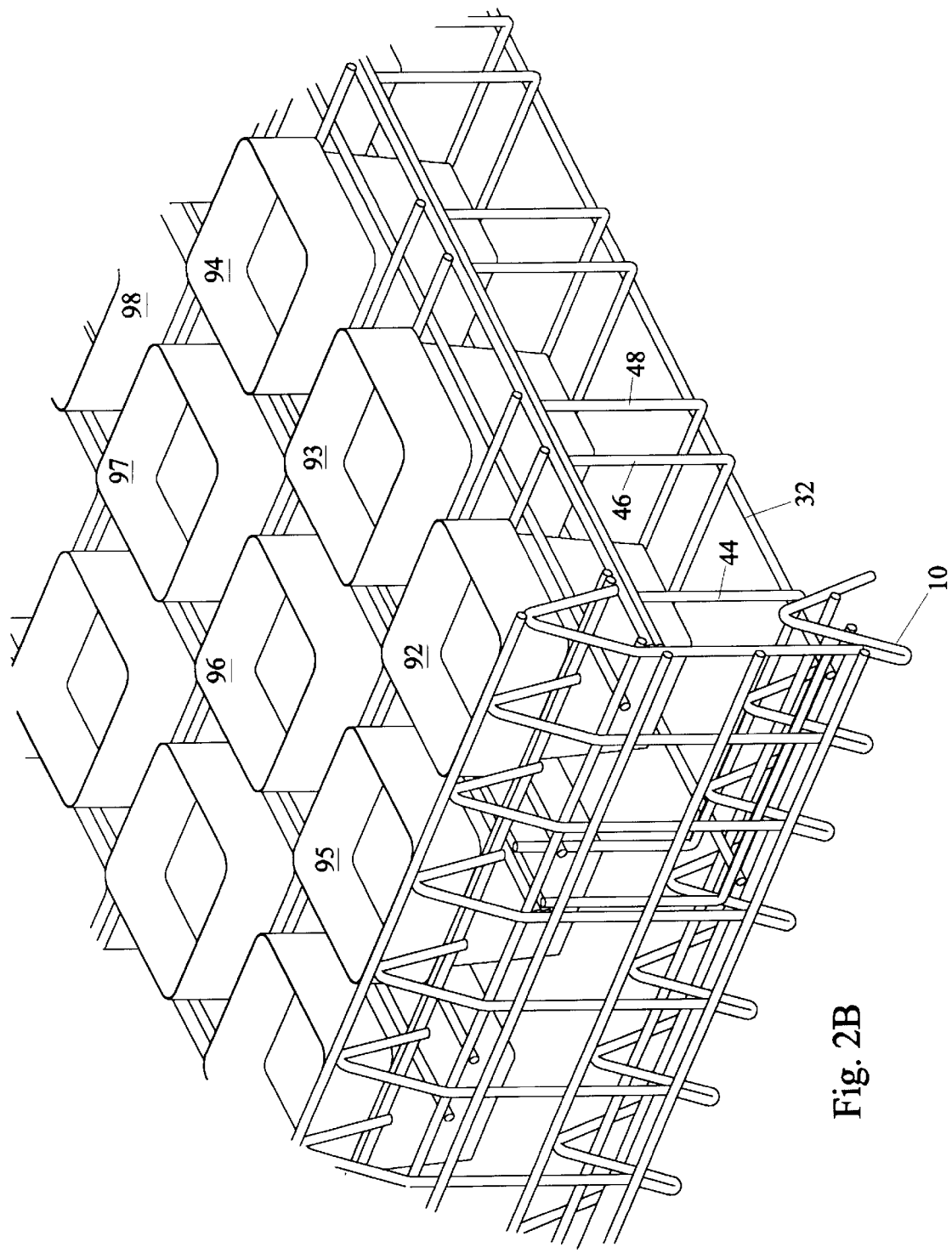
FIG. 2B is an enlarged view of a corner section of FIG. 2A.

FIG. 2A is a perspective view 1 of the novel bench/pallet invention of FIG. 1A with the pots 92, 93, 94, 95, 96, 97, 98 arranged in side-by-side adjacent openings in the grid. FIG. 2B is an enlarged view of a corner section of FIG. 2A.

Figure 3:
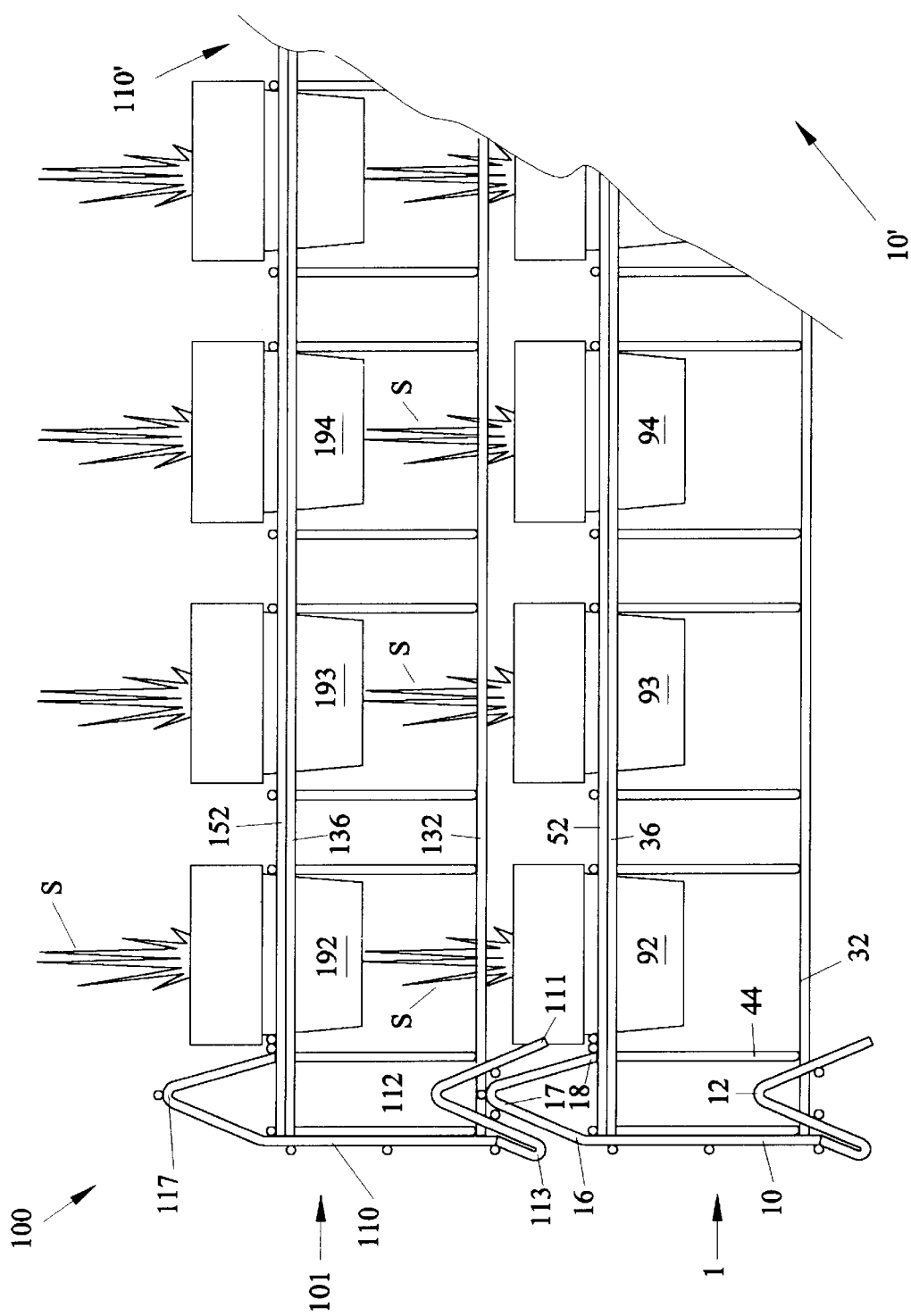
FIG. 3 is a side view of stacking the three inch size opening bench/pallet of FIGS. 2A–2B on top of another similar bench/pallet.

FIG. 3 is a side view 100 of stacking an additional three inch size opening bench/pallet 101 on top of the 3" size opening bench/pallet 1 of FIGS. 2A–2B. Note that the inside of leg members 111, 112, 113 of vertical stacking member 110 interlocks over and about the angled bent top point 17 of upper arm 16-18 of lower vertical stacking member 10. Opposite vertical stacking members 110' and 10' (not shown) interlock in a similar arrangement. Stacking bench/pallet 101 on top of bench/pallet 1 allows for seedlings S, from the pots 92, 93, 94, to have clearance underneath pots 192, 193, 194 supported by upper bench/pallet 101. When the vertical stacking members 10 and 110 are interlocked their respective bench/pallet are supported such that several more benches can be stacked on top, where the resultant stacked pile is both rigid and efficiently uses up any vertical airspace that is being used.

Figure 4B:
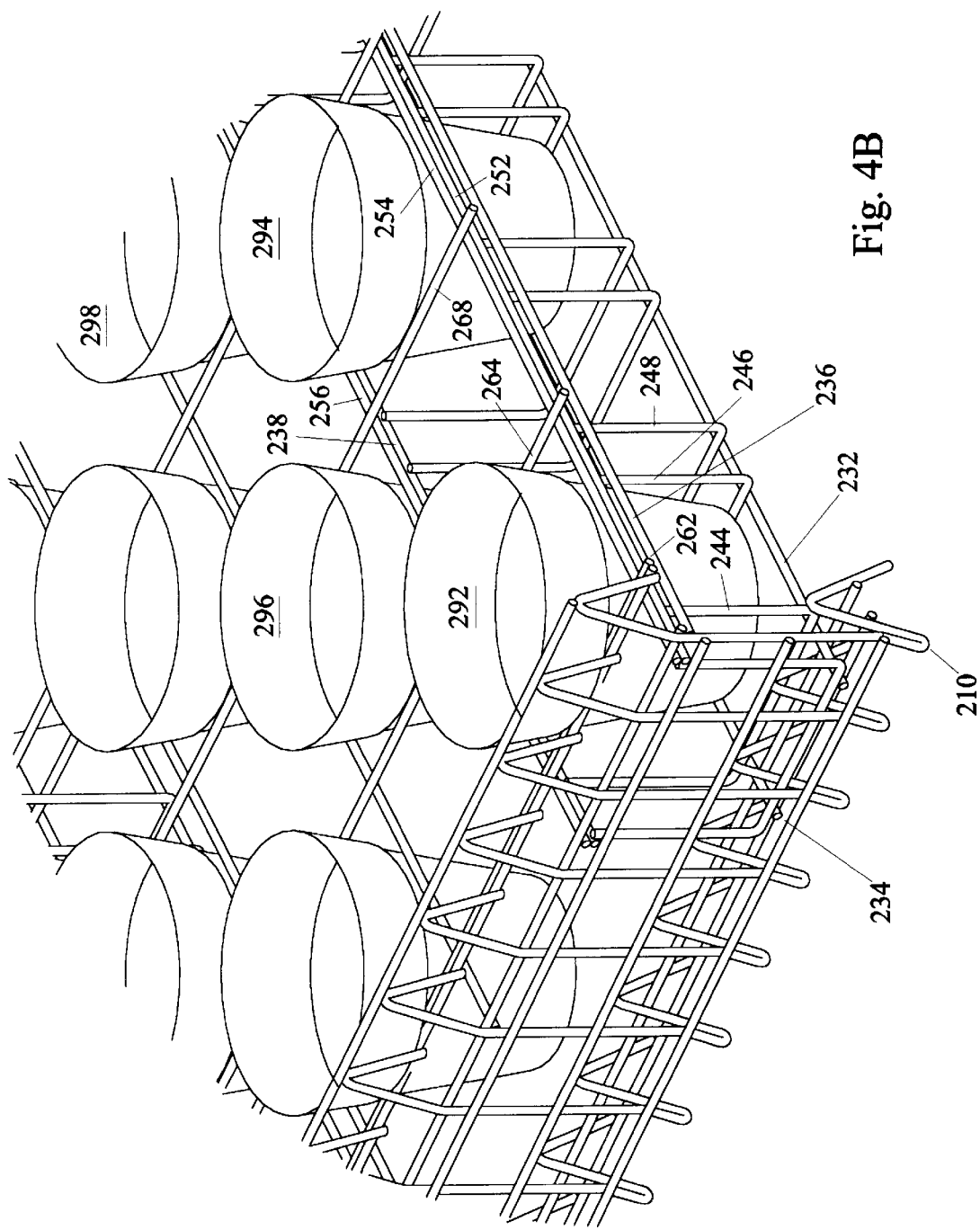
FIG. 4B is an enlarged view of a corner section of FIG. 4A.

FIG. 4A is a perspective view 200 of the novel bench/pallet invention with four inch wide openings for holding four inch diameter pots in a staggered arrangement to one another. FIG. 4B is an enlarged view of a corner section of FIG. 4A. Referring to FIGS. 4A–4B, bench/pallet 200 has an overall width W2, of approximately 3', 10.635" long, and an overall length L2 of approximately 5', 4.1875". Across both width ends, approximately 210N and 210'N' stacking members are shown, where N in this preferred embodiment is 32, so that there is one stacking member 10 approximately every 1.3". Stacking members 210 to 210N correspond to stacking members 10–10N with horizontal members similar to that of the previous embodiment connecting one to the other.

Bottom longitudinal galvanized wire members 232, 234 (only two are shown for clarity) are welded to horizontal cross-members of vertical stacking members 210 similar to that of the previous embodiment. A grid is formed by welding longitudinal and horizontal wires between stacking members 210–210N, and stacking members 210'–210'N'. Referring to FIG. 4B, the grid has end parallel longitudinal wire members 252, 254 spaced approximately 4" apart from parallel longitudinal wire members 256 each having portions welded to horizontal wires of stacking members 210 similar to that of the previous embodiment Perpendicular to longitudinal wire members 252, 254, 256, and welded across are additional horizontal wire member 262, spaced approximately 4" apart from parallel wire member 264, which is spaced approximately 4" apart from parallel member 268. An additional longitudinal wire member 236 can be welded underneath wire member 252 for additional support. Between the wire grid of members 252, 254, 256, 262, 264, 266, 268 and bottom members 232, 234, are U-shaped channel wire members 244, 246, 248 having ends welded thereto. FIG. 4A shows four rows of U-shaped channel members can be used on the grid. As shown, the grid has approximately 4" openings between wire members to allow for the lip edges of 4" size pots 292, 294, 296, 298, and so forth to be supported within the 4" openings.

Figure 5B:
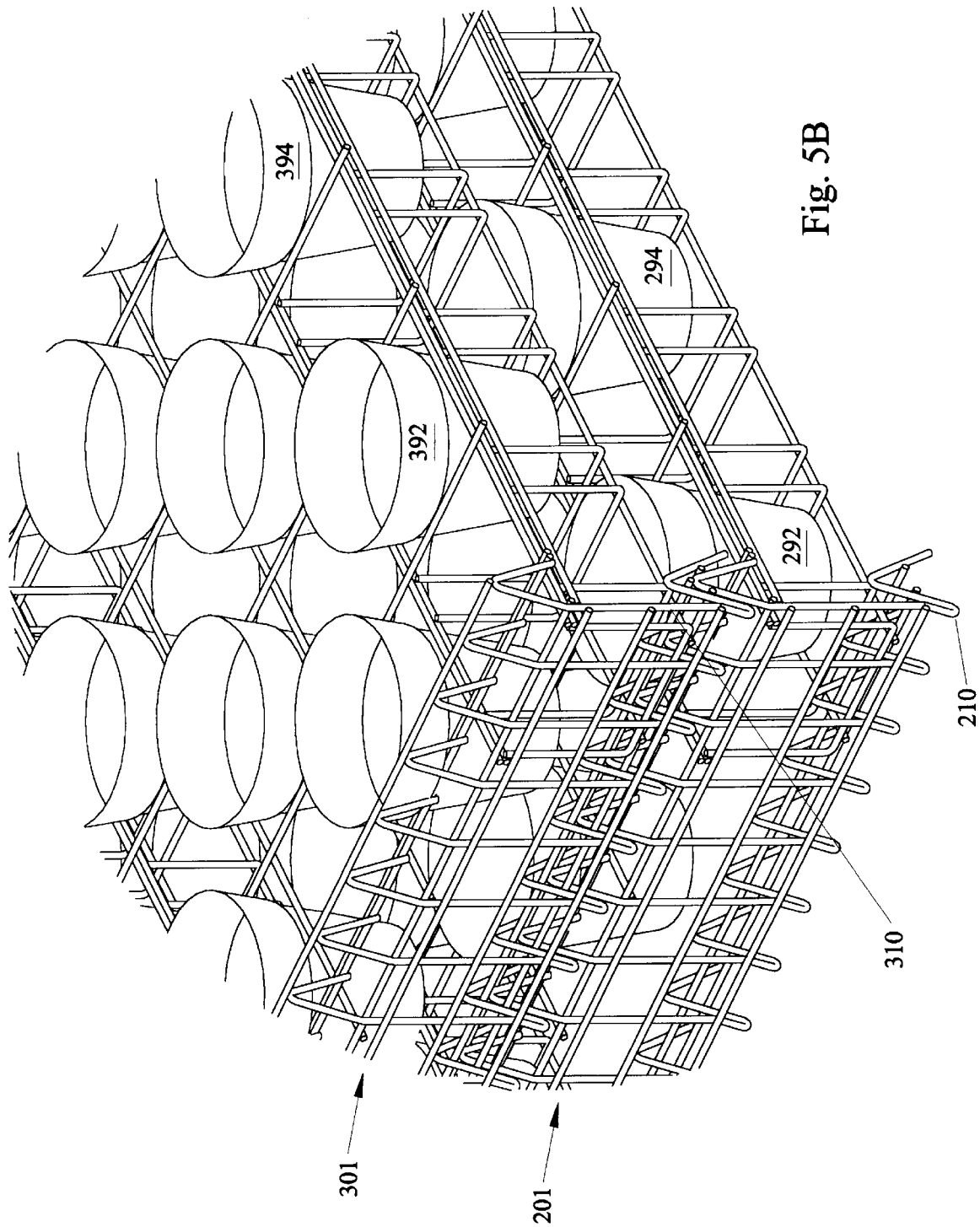
FIG. 5B is an enlarged view of a corner section of two stacked bench/pallets of FIG. 5A.
Figure 5C:
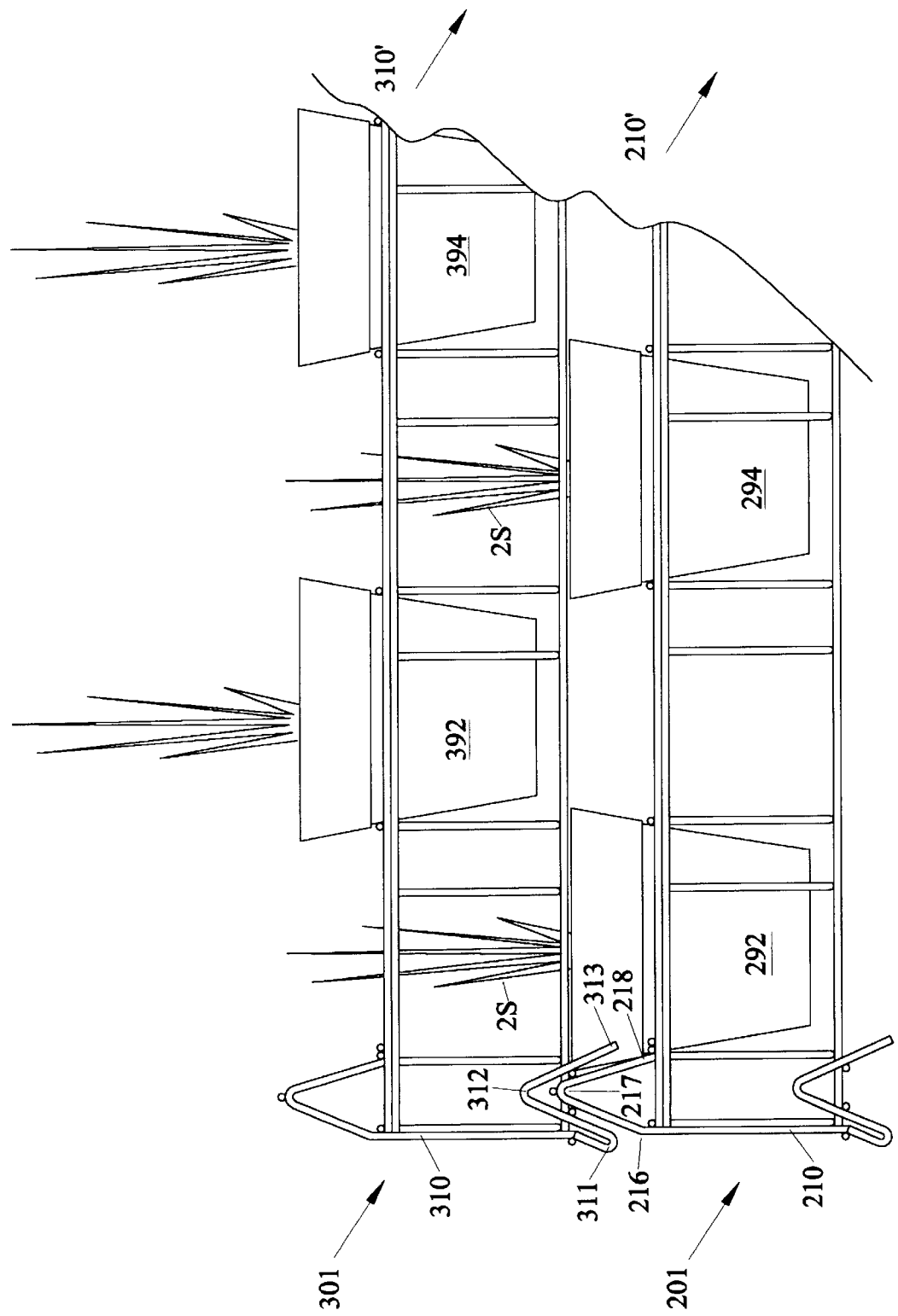
FIG. 5C is a side view of the lower two stacked bench/pallets of FIG. 5A along arrow A.

FIG. 5A is a perspective view of stacking a bench/pallets 301, and 401 each having four inch wide openings on top of like bench/pallet 201 of FIG. 4A. FIG. 5B is an enlarged view of a corner section of two stacked bench/pallets 201 and 301 of FIG. 5A. FIG. 5C is a side view of the lower two stacked bench/pallets 201 and 301 of FIG. 5A along arrow A.

Referring to FIGS. 5A–5C, the inside of leg members 311, 312, 313 of vertical stacking member 310 interlocks over and about the angled bend top point 217 of upper arm 216-218 of lower vertical stacking member 210. Opposite vertical stacking members 310' and 210' (not shown) interlock in a similar arrangement. Stacking bench/pallet 301 on top of bench/pallet 201 allows for seedlings 2S, from the staggered arranged supported pots 292, 294, to have clearance underneath staggered arranged pots 392, 394 supported by upper bench/pallet 301.

The novel wire benches can be formed from hot dipped galvanized wire, or a similar protective coating(stainless, plastic, rubber, and the like), that can be applied to the wire benches after welding the components together in order to extend the life of the benches/pallets in corrosive environments.

While the preferred embodiment describes having wire benches for three and four inch sized pots, the invention can be applied to five inch pots, six inch pots, and larger.

Although the preferred embodiment describes using galvanized metal wire for the vertical stacking members, and the components of the grid, and its supports, the novel stackable bench/pallet invention can be made from other materials such as but not limited to injection molded plastic, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A wire bench for storing planting pots comprising in combination:
    a first pallet formed from wire grids, the grids having openings in an upper surface;
    u-shaped channel wire members arranged in parallel rows within the first pallet for providing rigidity and sturdiness to the grid;
    a first set of planting pots that can individually be stored and separated from one another in the upper surface openings in the wire grids of the first pallet;
    upper bent edges projecting upwardly above the first pallet; and
    lower bent edges projecting downwardly beneath the first pallet, where the first pallet can be stacked above and below an identical pallet.

2. The wire bench for storing planting pots of claim 1, wherein the openings include:
    a diameter large enough to fit three inch diameter pots therein.

3. The wire bench for storing planting pots of claim 1, wherein the openings include:
    a diameter large enough to fit four inch diameter pots therein.

4. The wire bench for storing planting pots of claim 1, wherein the pallets can be formed from wire chosen from one of:
    hot dipped galvanized wire, and coated wire, that extends lifespan of the pallets in a corrosive environment.

5. The wire bench for storing planting pots of claim 4, wherein the grids are formed by:
    welding wire members of the wire grids to one another.

6. The wire bench for storing planting pots of claim 1, wherein the u-shaped channel members includes:
    a first row of u-shaped channels adjacent to one side of the pallet;
    a second row of u-shaped channels adjacent to a second side of the pallet opposite to the first side of the pallet; and
    a middle row of u-shaped channels approximately midway between the first row and the second row of u-shaped channels.

7. Stackable wire benches for storing planting pots to allow seedlings to grow, comprising:
    a first pallet having wire grid openings;
    first vertical stacking members attached to opposite ends of the first pallet, the first vertical stacking members having upper bent tips protruding above the wire grid openings, and lower legs extending below the wire grid openings;
    first set of pots arranged in the grid openings of the first pallet;
    a second pallet having wire grid openings;
    second vertical stacking members having upper bent tips protruding above the wire grid openings, and lower legs extending below the wire grid openings; and
    second set of pots arranged in the grid openings of the second pallet, wherein portions of the lower legs of the second pallet can abut against and interlock with portions of the upper bent tips of the first pallet so that the second pallet can be stacked on top of the first pallet, and air spaces allow seedlings to grow in the first set of pots and in the second set of pots while the first pallet and the second pallet are stacked.

8. The stackable wire benches of claim 7, wherein the first sets of pots and the second sets of pots are arranged:

substantially in every adjacent opening in the first pallet and every adjacent opening in the second pallet, so that the pots in the second pallet are directly on top of the pots in the first pallet.

9. The stackable wire benches of claim 7, wherein the first set of pots and the second set of pallets are arranged:

substantially in staggered openings in the first pallet and staggered openings in the second pallet, so that the staggered pots in the second pallet are not directly on top of the staggered pots in the first pallet.

10. A stackable wire bench pallet for storing plantings comprising:

grid openings in an upper surface of a wire pallet for supporting individual plantings;

upper inwardly angled edges projecting upwardly above the wire pallet; and lower angled edges projecting downwardly beneath the wire pallet, wherein portions of the upper inwardly angled edges can abut against and interlock with identical lower angled edges on a first identical pallet, and portions of the lower angled edges can abut against and interlock with identical upper inwardly angled edges on a second identical pallet in order to form stackable bench pallets with air spaces between each pallet.

11. The stackable wire bench pallet of claim 10, further comprising:

parallel u-shaped channels in the wire pallet adjacent to the grid openings for providing strength and rigidity to the wire pallet.

12. The stackable wire bench pallet of claim 11, wherein the parallel u-shaped channel members includes:

a first u-shaped channel row adjacent to one side of the pallet;

a second u-shaped channel row adjacent to a second side of the pallet opposite to the first side of the pallet; and a middle u-shaped channel row approximately midway between the first u-shaped channel row and the second u-shaped channel row.

* * * * *